United States Patent Office 2,969,094
Patented Jan. 24, 1961

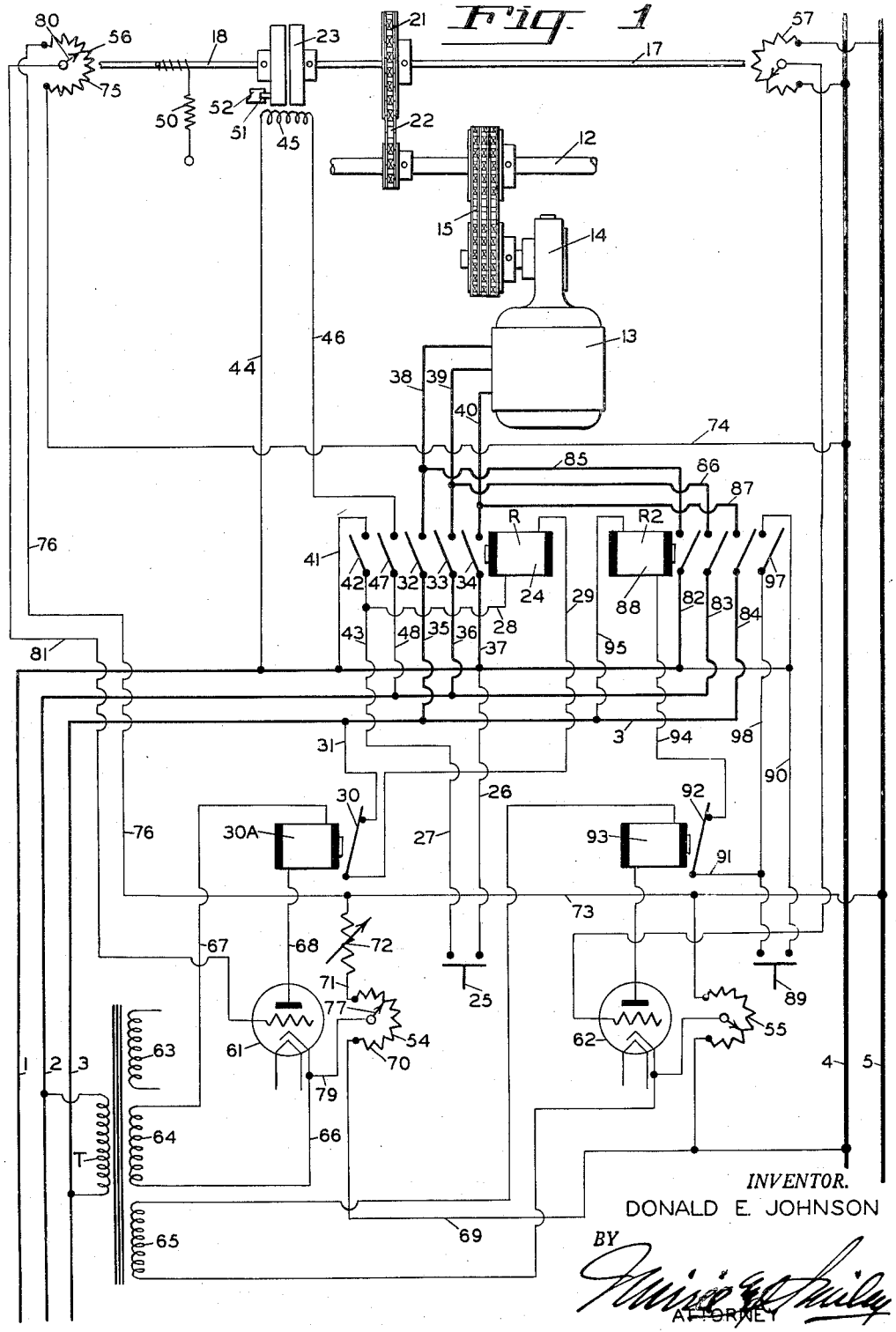

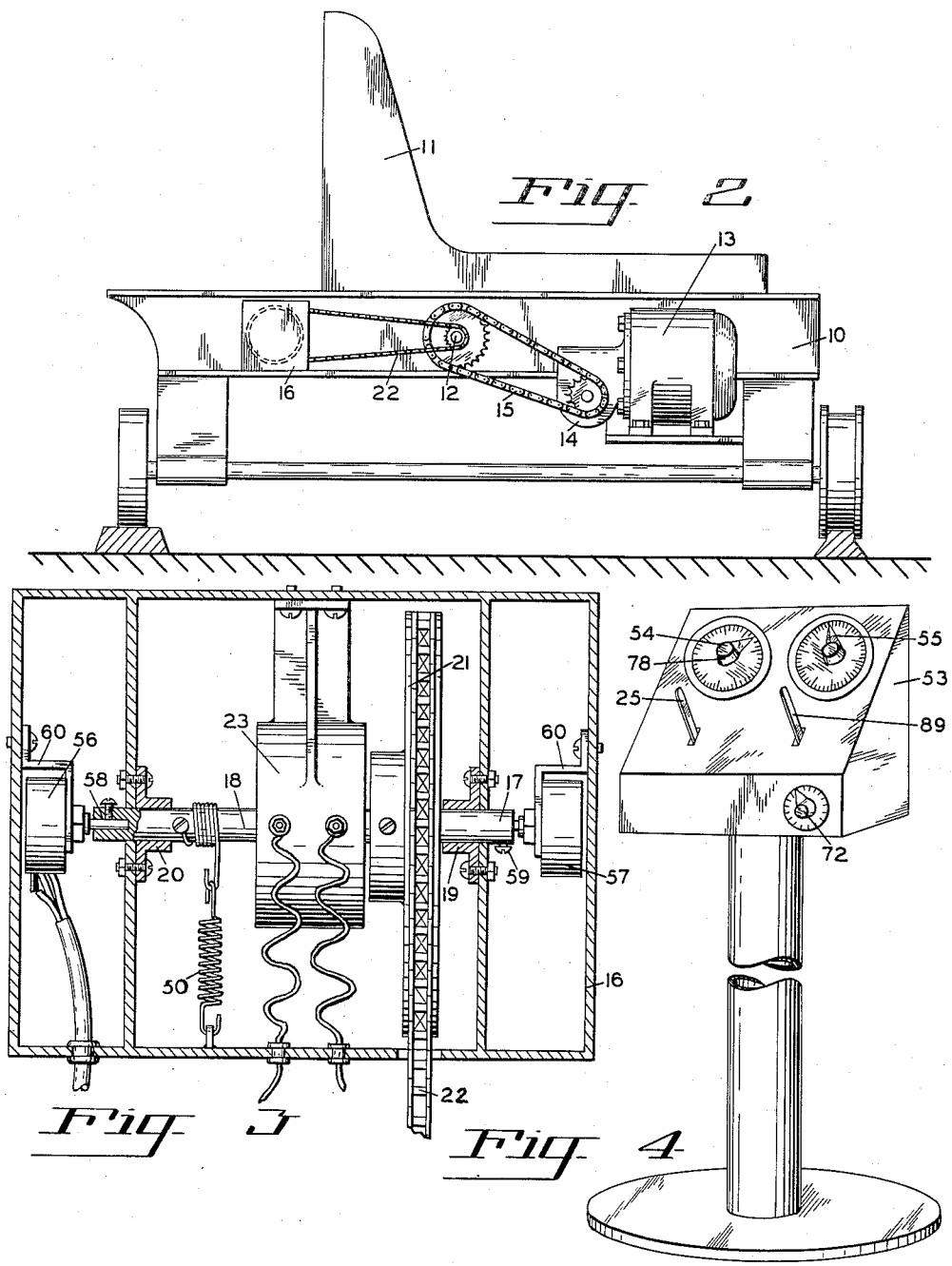

2,969,094

ELECTRICALLY OPERATED AUTOMATIC SAWMILL SET-WORKS

Donald E. Johnson, 3139 SW. Altadena Terrace, Portland, Oreg.

Filed July 26, 1955, Ser. No. 524,519

2 Claims. (Cl. 143—120)

The present invention relates to a system for automatically stopping an electric motor in accordance with the position of an element operated by the motor.

Although it is well known to employ various means for accomplishing the automatic adjustment or positioning of the set works of a sawmill carriage, to the best of my knowledge, all such prior art devices are subject to certain difficulties which the present invention is believed to overcome. For example, the use of electromagnetic switches or relays to accomplish the positioning of the set works with the relay being actuated in conjunction with a rheostat or variable resistor movable or altered as a result of carriage movement is well known.

However, because of the inherent vibration attendant upon the operation of a sawmill set works, such mechanical devices are subject to premature actuation which, in itself, cannot be accurately forecast due to the fact that the intensity of vibration at any given instant cannot be accurately predetermined. That is to say, in such devices, the relay or electromagnetic switch is energized with a steadily increasing current as the carriage approaches the position at which it is desired to halt its movement. Due to this steadily increasing current, the relay or electromagnetic switch comes nearer and nearer to a point at which it will become actuated.

Consequently, at some time, it will not take a great deal of vibration to cause the premature making of the associated switch mechanism because the current value is very close to being sufficient to actuate the mechanism by itself. Therefore, although such devices usually approach a degree of accuracy, they do not achieve the positioning of the carriage at a predetermined position or at least with sufficient accuracy to be entirely satisfactory and reliable.

It is, therefore, a primary object of this invention to provide means for automatically stopping the set works of a sawmill carriage at a predetermined position to obtain a predetermined thickness of cut of a log carried by the set works and/or to adjust the set works to a predetermined degree of retraction to receive a log.

An important object of the invention is in the provision of an electrical system operable in conjunction with the set works motor and the knees moved by the operation of the motor to stop the motor and position the knees at any predetermined spot automatically.

However, a more basic object of the invention is in the provision of an electrical system for halting the movement of a member by deenergizing the source of movement of the member automatically when the member has reached a predetermined position.

An important object of the invention is to provide a novel arrangement of variable resistors and an electronic tube such as a Thyratron tube whereby when the resistors reach a predetermined matching relation with one another the electronic tube operates an electric relay to open a circuit.

Another object of the invention is to automatically control the amount of extension and retraction of the knees on a sawmill carriage.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts through the several figures and in which:

Figure 1 is a diagrammatic mechanical and electrical layout of this new and improved automatic set works.

Figure 2 is an end view of a sawmill carriage showing the set works motor, set shaft and control unit for moving the knees of the carriage towards the saw line.

Figure 3 is a plan sectional view of the electric control unit.

Figure 4 is a perspective view of the operator's remote control station.

Referring to the drawings in detail, there is shown in Figure 2, a sawmill carriage 10. Knees 11 are carried by the carriage 10 for traversing movement thereacross by a conventional rack and pinion arrangement (not shown). A reversible set works motor 13 is mounted on the carriage and drives a set shaft 12 from a suitable gear reduction unit 14 through the medium of endless chain 15 entrained over suitable sprockets on shaft 12 and the driven shaft of the gear reduction unit 14.

Mounted on the carriage 10 is a control unit 16 for automatically controlling the movement of the set works, formed by the knees 11 and associated operating structure on the carriage for positioning logs on the carriage relative to the saw. It is this control unit and its cooperation with the carriage motor 13 and set shaft 12 which comprises the present invention.

The control unit 16 and the operation thereof is illustrated in detail in Figures 1 and 3 and reference is first directed to Figure 3 for a description of the physical elements making up the unit.

Basically the unit 16 embodies a housing within which are disposed two axially aligned shafts 17 and 18 respectively journaled at their remote ends respectively in bearings 19 and 20. Intermediate its ends, shaft 17 has keyed thereto a sprocket wheel 21 which is driven by endless chain 22 from set shaft 12. An electrically operated clutch unit 23 operates in a manner to be presently described to operatively couple driven shaft 18 to the drive shaft 17 in response to energization of motor 13 to move the log setting knees 11 to a predetermined position relative to the saw and stop the knees in such predetermined position.

It is the last mentioned feature of the unit 16 which constitutes the novelty of the present invention, this feature providing a means for automatically stopping the movement of the carriage knees 11 in either extended or retracted position. Thus, when the knees are extended to place the log adjacent the saw, the knees are automatically stopped at a predetermined position relative to the saw to cut a board of predetermined thickness from the log. When the knees are retracted, they may be automatically stopped at a predetermined degree of retraction in accordance with the diameter of the particular log to be handled on the carriage by the set works.

In order to accomplish the results of the foregoing paragraph, two electrical circuits are provided for energizing motor 13, and then deenergizing motor 13 to stop further movement of carriage knees 11. One circuit controls the degree of extension of the knees and the other the degree of retraction of the knees.

Primarily each circuit functions to stop or deenergize motor 13 in response to the attainment of the same resistance. or some predetermined proportionate ratio of resistances of two adjustable resistors, one resistor (56 or 57) being carried by the carriage mounted control unit 16 and the other (54 or 55) being carried by a remote control panel 53 (Figure 4).

Referring to the electrical system of Figure 1 in detail, a three phase alternating supply current is supplied by electric lines 1, 2 and 3, and direct current is supplied by electric lines 4 and 5. Electrical energy for operating reversible motor 13 to extend knees 11 is supplied to the motor through a starting and holding relay R. The relay R is closed by energizing solenoid 24 by closing manual switch 25 mounted on the control panel 53. Closing switch 25 energizes solenoid 24 through lines 1 and 3 through conductors 26, 27, 28, 29, switch bar 30 of relay 30A and conductor 31 to close switch bars 32, 33 and 34 on lines 35, 36 and 37 thereby energizing motor 13 from lines 1, 2 and 3 through lines 38, 39 and 40.

Since switch 25 is only momentarily closed, an auxiliary holding circuit is provided to retain the relay R closed after release of the switch 25. This holding circuit consists of conductor 41 leading from line 1 through switch bar 42 (closed by energization of solenoid 24), to conductor 43, which is in turn attached to conductor 28 so that switch 25 is bypassed electrically and its opening is ineffectual to stop motor 13.

Switch bar 47, also closed by the energization of solenoid 24, connects conductor 48 from line 2 with conductor 46 to energize solenoid 45 of clutch 23 connected to line 1 through conductor 44. Upon energization of solenoid 45, clutch 23 interlocks shafts 17 and 18 for unitary rotation. Solenoid 45, of course, will remain energized as long as relay R is closed.

As will be noted in Figure 3, adjustable resistor 56 of control unit 16 is operated by rotation of shaft 18, being locked thereto by pin 58 while adjustable resistor 57 is locked to shaft 17 for rotation therewith by pin 59. Brackets 60 carried by the housing of the control unit 16 prevent resistor housings of 56 and 57 from turning with their associated shafts.

Located within the remote control panel 53 are two vacuum tubes 61 and 62 respectively, vacuum tube 61 being connected to variable resistor 54 through conductor 79 and tube 62 being connected to variable resistor 55 by a similar conductor.

When motor 13 is energized through push button 25, resistor 56 will be rotated in response to rotation of set shaft 12 by virtue of the interlocking relation of shaft 18 with shaft 17, which latter shaft is connected by chain and sprocket to set shaft 12. When resistor 56 has rotated an amount to raise the resistance thereof to the same or some predetermined corresponding proportion of the resistance to which resistor 54 has been preset, electronic tube 61 will cause the motor 13 to stop as follows.

A transformer T has the primary winding thereof connected across lines 2 and 3 thereby inducing current through secondary windings 63, 64 and 65. Secondary winding 64 is connected to the cathode of tube 61 by conductor 66 and is connected to relay 30A by conductor 67, the relay 30A being further connected to the plate tube by conductor 68.

The tube 61 is caused to conduct electric current from the plate circuit to the cathode circuit thereof by adjusting the voltages on both the grid circuit and the cathode circuit to a relative electric potential by adjustable resistors 54 and 56; secondary winding 63 furnishes a filament circuit for tubes 61 and 62.

Conductors 69 and 73 connect variable resistors 54 and 55 of the control panel 53 to the direct current supply lines 4 and 5 energizing the resistance elements 70 thereof. Variable resistor 72 on conductor 71 is utilized as the electrical connecting link for resistor 54 to conductor 73. The purpose of resistor 72 in conjunction with resistor 54 is to provide very close control of the extension of the knees 11 of the carriage 10 when it is necessary to slightly vary the cut of the log or board a fraction of an inch from the predetermined thickness.

Conductors 74 and 76 connect the resistance element 75 of variable resistor 56 to direct current lines 4 and 5 and similar conductors thereto (unnumbered) connect variable resistor 57 to direct current lines 4 and 5 for the reversing circuit.

Conductor 81 connects the moving contact 80 of resistor 56 to the grid of tube 61 and a similar conductor connects the moving contact of resistor 57 to the grid of tube 62. Conductor 79 connects the moving contact 77 of resistor 54 to the cathode of tube 61 and a corresponding conductor connects resistor 55 to tube 62 of the reversing circuit.

Thus when the relative voltage at the grid is in proper relation with the cathode voltage, tube 61 or 62, depending on the circuit actuated, will conduct current from the plate to the cathode. When this current flows through tube 61, assuming the knee extension circuit to be energized through switch 25, an electrical path is completed from secondary winding 64 through conductor 67 to solenoid relay 30A, through conductor 68, tube 61 and back to winding 64. This circuit causes relay 30A to open, interrupting the circuit to relay R by breaking the path of flow through switch 30. Motor 13 is thus stopped when knees 11 have been extended to their predetermined extent automatically.

That is to say, it will be appreciated from the above that by utilizing an electronic tube, such as that shown and described, the electric energy needed to cause the proper positioning will be available when, and only when, an accurate predetermined position has been achieved. In other words, the situation is not such that electric current is available in a steadily increasing or decreasing amount so that at some point when the electric energy is near the requisite value, mechanical vibration can accidentally cause actuation of the mechanism. Stating it in another way, the present invention contemplates a system which operates instantaneously and at a particular and given instant, predetermined, which extremely accurately controls the positioning.

To recede the knees 11 of the carriage 10 back from the saw line to accommodate different sized logs, the degree of recession of the knees may be controlled in exactly the same manner as the degree of extension thereof previously described.

Thus, motor 13 is reversed through relay R2 by pressing push button 89 on the remote control panel 53. Relay R2 receives energy from lines 1, 2 and 3 through conductors 82, 83 and 84, and delivers energy to motor 13 through conductors 85, 86 and 87 connected to lines 38, 39 and 40, when the switches interconnecting conductors 85, 86 and 87, and conductors 82, 83 and 84 are closed by solenoid 88 of relay R2.

To retain solenoid 88 energized after release of push button 89, switch 97 which has been closed by energization of solenoid 88, completes the circuit to solenoid 88 through conductor 90 connected to line 1, and conductor 98, 91, switch bar 92, conductor 94, solenoid 88, and conductor 95 to line 3.

Variable resistor 57 operated by shaft 17 is operatively connected to variable resistor 55 on control panel 53 through vacuum tube 62. When the resistance of resistor 57 reaches the proper value in relation to the preset resistance of resistor 55, tube 62 energizes solenoid 93 to open switch 92 and break electrical connection between conductors 91 and 94 thereby deenergizing relay R2 and stopping motor 13.

Obviously the forward and the reversing circuits may be used independently of one another.

During the forward operation of the knees 11, after the motor has been stopped by the electric system described, it is desirable to return the variable resistor 56 to its starting position and to this end, a return spring 50 is attached to the housing of unit 16 at one end, then wound upon shaft 18 and attached thereto at its other end. When shaft 18 is released from shaft 17 by a cessation of electric current to clutch 23, spring 50 returns shaft 18 and resistor 56 to their original position.

The system provides a means whereby the set works operator can preset the distance the log will move out toward the saw line upon operation of the set works simply by setting resistor 54 on the control panel 53 before pulling switch 25 to start the set works motor 13.

Conversely, when motor 13 is reversed to retract the knees 11 for reception of a log, the amount of retraction of the knees can be preset by initially adjusting variable resistor 55 before pulling switch 89.

Although a certain specific embodiment of the invention has been shown and described, it is obvious that many modifications thereof are possible. The invention, therefore, is not to be restricted except in so far as is necessitated by the prior art and by the spirit of the appended claims.

What I claim is:

1. In combination with a sawmill having extensible and retractible knees for positioning logs, a motor for actuating said knees, a source of power for said motor and an electric control system for controlling the operation of said motor to position said knees; said control system including an electromagnetic member responsive to a predetermined voltage to effect alteration between a driving and a nondriving condition of said motor, a potentiometer connected to and driven with said motor, a manually operable potentiometer, and an amplifying electronic tube, said electromagnetic member being connected to the plate circuit of said electronic tube, each potentiometer including a fixed resistance portion and a movable contact to be swept across the fixed resistance portion, a direct current source, said fixed resistance portions being connected in parallel across said direct current source, the movable contact of said manually operable potentiometer being connected to the cathode of said amplifying tube and the movable contact of said motor driven potentiometer being connected to the plate circuit control means of said amplifying tube, whereby actuation of said electromagnetic member will be effected instantaneously and at a particular and predetermined given instant in accordance with the positioning of said manually controlled potentiometer, said control system further including a second amplifying electronic tube, a second electromagnetic member responsive to a predetermined voltage to effect a driving condition of said motor different from the first mentioned driving condition of the motor, a second potentiometer connected to and driven with said motor, a second manually operable potentiometer, said second electromagnetic member being connected to the plate circuit of said second electronic tube, each of the second potentiometers including a fixed resistance portion and a movable contact to be swept across the fixed portion, the fixed resistance portions of said second potentiometers being connected in parallel across said second direct current source, the movable contact of said second manually operable potentiometer being connected to the cathode of said second amplifying tube and the movable contact of said second motor driven potentiometer being connected to the plate circuit control means of said second amplifying tube.

2. The combination of claim 1 wherein said first and second electromagnetic members are in the form of relays.

References Cited in the file of this patent

UNITED STATES PATENTS

| | | |
|---|---|---|
| 1,847,893 | Palmer | Mar. 1, 1932 |
| 1,879,176 | Gast | Sept. 27, 1932 |
| 2,020,275 | Beers | Nov. 5, 1935 |
| 2,175,822 | Best | Oct. 10, 1939 |
| 2,342,967 | Peters | Feb. 29, 1944 |
| 2,435,966 | Isserstedt | Nov. 17, 1948 |
| 2,467,454 | Arnot | Apr. 19, 1949 |
| 2,488,291 | Hartley | Nov. 15, 1949 |
| 2,492,392 | Moseley | Dec. 27, 1949 |
| 2,498,654 | Deakin | Feb. 28, 1950 |
| 2,543,950 | Yardeny et al. | Mar. 6, 1951 |
| 2,695,982 | Soller et al. | Nov. 30, 1954 |
| 2,721,588 | Roberts | Oct. 25, 1955 |
| 2,739,626 | Southworth et al. | Mar. 27, 1956 |